United States Patent Office 3,174,947
Patented Mar. 23, 1965

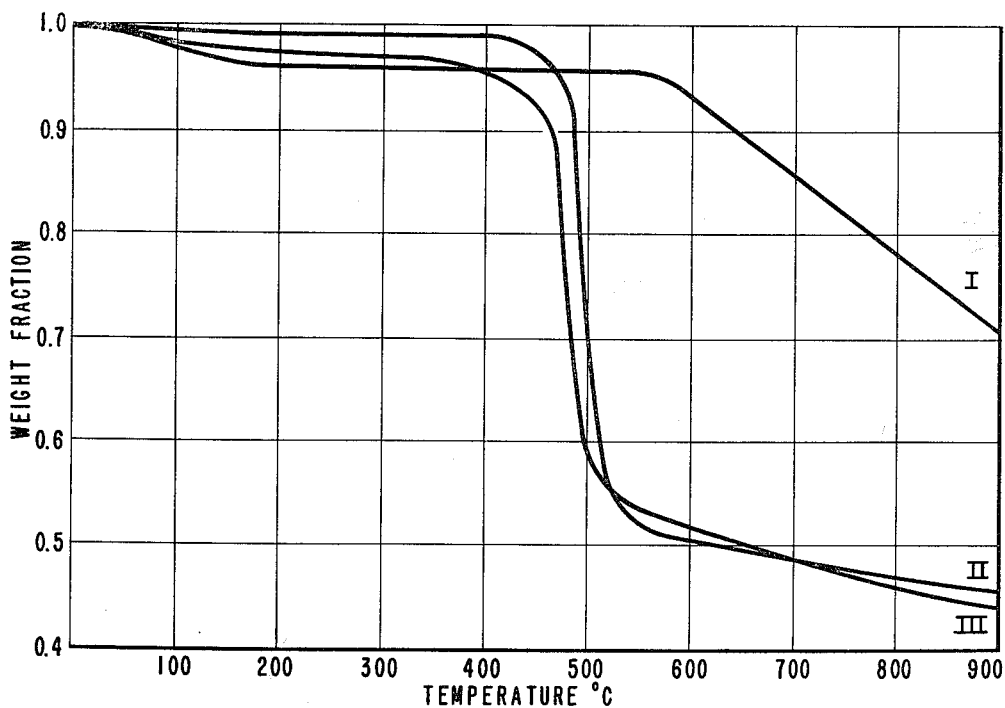

3,174,947
POLYBENZIMIDAZOLES AND THEIR PREPARATION
Carl S. Marvel, Tucson, Ariz., and Herward A. Vogel, North St. Paul, Minn., assignors to University of Illinois Foundation, Urbana, Ill.
Filed Feb. 14, 1962, Ser. No. 174,355
18 Claims. (Cl. 260—47)

This application is a continuation-in-part of our copending application Serial No. 63,101, filed October 17, 1960, and now abandoned.

This invention relates to a novel and useful class of high molecular weight and condensation polymers and to a process for the preparation of such polymers. More particularly, it relates to high molecular weight condensation polymers which are characterized by high melting points and a high degree of stability at elevated temperatures.

It is an object of this invention to provide a novel and useful process for the preparation of high molecular weight aromatic polybenzimidazoles.

Another object is to provide a novel and useful class of high molecular weight condensation polymers characterized by a high degree of thermal stability.

A further object is to provide a novel and useful class of high molecular weight polybenzimidazoles which are wholly aromatic in character, and which possess benzimidazole nuclei as recurring units in the polymeric chain.

It is a still further object to provide shaped articles of aromatic polybenzimidazoles.

These and other objects will become apparent in the course of the following specification and claims.

The figure is a series of curves comparing the relative stability to high temperature of three polymers as identified in Example II. The curve plots weight fraction as ordinate versus temperature in degrees centigrade as abscissa.

In accordance with the present invention a high molecular weight polybenzimidazole is prepared by a process comprising (I) melt polymerizing a member of the class consisting of (A) an aromatic compound containing ortho disposed diamino substituents and a phenylcarboxylate ester substituent and (B) a mixture of (1) an aromatic compound containing a pair of ortho-diamino substituents on the aromatic nucleus and (2) a member of the class consisting of (a) the diphenyl ester of an aromatic dicarboxylic acid, (b) the diphenyl ester of a heterocyclic dicarboxylic acid wherein the carboxyl groups are substituents upon carbon in a ring compound from the class consisting of pyridine, pyrazine, furan and quinoline and (c) an anhydride of an aromatic dicarboxylic acid and (II) thereafter solid state polymerizing the pulverized product of the melt polymerization. As is illustrated by Example I below, the process may be employed to prepare an aromatic polybenzimidazole by the self-condensation of a trifunctional monomer containing an ortho-phenyl-diamino group and a phenylcarboxylate group, producing a head-tail type of polymer. These polymers may be represented as consisting essentially of recurring units of the formula

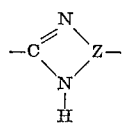

wherein —Z— is an aromatic nucleus having the nitrogen atoms forming the benzimidazole ring paired upon adjacent carbon atoms of the said aromatic nucleus.

In addition to the above, tetraamino aromatic compounds containing a pair of ortho disposed amino groups can be reacted with either the diphenylester or an anhydride of an aromatic dicarboxylic acid to form a polybenzimidazole of the head-head, tail-tail variety. These polymers may be represented as consisting essentially of recurring units of the formula

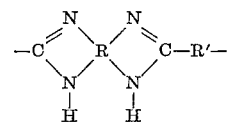

wherein R is an aromatic nucleus symmetrically tetra substituted with nitrogen atoms forming the benzimidazole ring paired upon adjacent carbon atoms of the said aromatic nucleus, R' being a member of the class consisting of (I) a carbocyclic aromatic ring and (II) a heterocyclic ring from the class consisting of (A) pyridine, (B) pyrazine, (C) furan and (D) quinoline.

In the first step of the process, the reactants are melted and heated until a polymer of intermediate molecular weight (solid at about 250° C. and below) is obtained. Thereafter the melt formed polymer is pulverized and subjected to solid state powder polymerization to produce a product of high molecular weight. High molecular weight aromatic polybenzimidazoles, i.e. having an inherent viscosity in formic acid at 25° C. of at least about 0.3 are produced in quantitative yield in this manner, as is shown by the examples which follow.

The following examples are intended to illustrate the present invention, but no limitations to the scope of the invention are implied. In these examples, inherent viscosities have been determined in accordance with the following equation:

$$\eta_{inh} = \frac{\ln \eta_{rel}}{C}$$

The relative viscosity ($\eta_{rel}$) may be determined by dividing the flow time in a capillary viscometer of a dilute solution of the polymer by the flow time for the pure solvent. The concentration (C) is generally 0.2 gram of polymer per 100 ml. of solution. The measurements are made at a temperature of 25° C. in formic acid solution, unless otherwise noted. If not specifically noted to the contrary, the melt temperatures for all polymers are in excess of 500° C.

Example I

The preparation of phenyl-3,4-diaminobenzoate may be effected by acetylating the amino group of para-aminobenzoic acid, followed by nitration, conversion of 3-nitro-4-acetaminobenzoic acid into its acid chloride by means of thionyl chloride, esterification with phenol, hydrolysis of the acetamino group, and reduction of the nitro group. The resulting phenyl 3,4-diaminobenzoate exhibits a melting point of 120–122° C. The monomer is heated under nitrogen for one hour at a temperature of 290° C. The resulting pale yellow solid mass possesses an inherent viscosity of 0.3, which value is increased to 1.3 by finely powdering the polymeric material and reheating at a pressure of 0.1 mm. or less for 1½ hours at a temperature of 350° C. and for an additional 1½ hours at a temperature of 400° C. The product is poly-2,5(6)-benzimidazole.

An attempt to make the above identified polymer from the methyl ester by melt polymerization of the methyl ester resulted in production of only low molecular weight product.

Example II

Benzidine is converted to its 3,3'-diamino derivative by acetylation, nitration, hydrolysis of the acetamino groups, reduction of the nitro groups with stannous chloride and hydrochloric acid, and isolation of the product.

A mixture of 10.7 grams of 3,3'-diaminobenzidine and 15.9 grams of diphenyl isophthalate is placed in a reaction vessel and purged with pure nitrogen by repeated evacuation and refilling. The mixture is heated under nitrogen while the temperature is slowly rised to 270° C. The resulting melt is highly viscous, and forms a solid yellowish foam upon evacuation to 0.1 mm. Over a period of 30 minutes, the temperature is slowly raised to 290° C.; the flask is then filled with nitrogen and permitted to cool. The polymer is finely powdered and reheated for a period of 4 hours under a pressure of 0.1 mm. at temperatures gradually rising from 300°–400° C., using a Wood's metal bath. The resulting polymer exhibits solubility in concentrated sulfuric acid, formic acid, and dimethyl sulfoxide, and an inherent viscosity of 2.3. Additional heating to a temperature of 500° C. at a pressure of 0.1 mm. increases the inherent viscosity to a value of 3.2. The product is poly-2,2'-(m-phenylene)-5,5'-bibenzimidazole.

Films of the aromatic polybenzimidazole prepared in accordance with the above procedure exhibit a T/E/M ratio of 0.7/7/35 when the measurements are made at a temperature of 25° C. This ratio changes to 0.5/9/15 when the measurements are made at a temperature of 200° C. The polymer is found to have a zero strength temperature in excess of 770° C. Loss of weight of the product upon exposure to a range of temperatures for periods of about three hours is illustrated graphically in the figure as curve "I." Curves II and III relate to poly(2,2'-tetramethylene-5,5'-bibenzimidazole) and poly (2,6-tetramethylene diimidazobenzene) respectively. As will be apparent from the curves, the polymers formed from the aliphatic acids exhibit a sharp break in stability toward heat at about 420° C.

*Example III*

The preparation of 1,2,4,5-tetraaminobenzene is accomplished by nitration of m-dichlorobenzene, followed by reaction with ammonia, reduction of the nitro groups and isolution of the product. A mixture of 5.33 grams of 1,2,4,5-tetraaminobenzene and 12.29 grams of diphenyl isophthalate is placed in a reaction vessel. The apparatus is purged with nitrogen by repeated evacuation and refilling, and then placed in a Wood's metal bath preheated to a temperature of 280° C. A reddish-brown melt is first formed which solidifies after about 10 minutes of heating, while phenol and water are distilling off. After 30 minutes of heating at 280° C., vacuum is employed for ½ hour while heating at the same temperature continues. The material is then powdered and reheated at a pressure of 0.1 mm. for a period of 4 hours, while allowing the temperature to rise gradually to 400° C. The resulting polymer exhibits an inherent viscosity of 1.1. The product is poly-2,6-(m-phenylene)-diimidazobenzene.

*Example IV*

A mixture of 2.14 grams of 3,3'-diaminobenzidine and 3.19 grams of the diphenyl ester of pyridine-3,5-dicarboxylic acid, prepared from the dicarboxylic acid by treatment with thionyl chloride, is heated under nitrogen for ½ hour at a temperature of 260° C. High vacuum is then employed for an additional ½ hours to remove most of the liberated phenol and water. The polymeric material is finely ground and reheated at a pressure of 0.1 mm. for 4 hours while gradually raising the temperature to 400° C. The resulting polymer exhibits an inherent viscosity of 1.48. The product is poly-2,2'-(pyridylene-3'',5'')-5,5'-bibenzimidazole.

*Example V*

The preparation of diphenyl furan-2,5-dicarboxylate is effected by the dehydration and cyclization of mucic acid to dehydromucic acid, followed by conversion to the acid chloride by means of phosphorous oxychloride, and esterification with phenol. A mixture of 3.21 grams of 3,3'-diaminobenzidine and 4.62 grams of diphenyl furan-2,5-dicarboxylate is heated under nitrogen for ½ hour at a temperture of 260° C. A foamed glassy product is produced when this reaction mixture is maintained at the same temperature for an additional 30 minutes while high vacuum is employed. The polymeric material is finely powdered and reheated at a pressure of 0.1 mm. for a period of 4 hours while the temperature gradually increases to 400° C. The resulting polymer possesses an inherent viscosity of 0.74, and a polymer melt temperature of 480° C. The product is poly-2,2'-(furylene-2'',5'')-5,5'-bibenzimidazole.

*Example VI*

By a procedure analogous to that described in Example II, a mixture of 2.14 grams of 3,3'-diaminobenzidine and 3.81 grams of diphenyl terephthalate is heated for a total of 5 hours, the final stages of the reaction being carried out at a temperature of 400° C. and at a pressure of 0.1 mm. The product exhibits an inherent viscosity of 1.00. The product is poly-2,2'-(p-phenylene)-5,5'-bibenzimidazole.

*Example VII*

By a procedure analogous to that described in Example III, a mixture of 1.665 grams of 1,2,4,5-tetraaminobenzene and 3.82 grams of diphenyl terephthalate is heated for a total of 4½ hours. The final stages of condensation are conducted under a pressure of 0.1 mm. and at a temperature of 360° C. The polymeric product exhibits an inherent viscosity of 0.80. The product is poly-2,6-(p-phenylene)-diimidazobenzene.

*Example VIII*

A mixture of 2.14 grams of 3,3'-diaminobenzidine and 3.94 grams of phenyl 4,4'-biphenyldicarboxylate is placed in a reaction vessel which is purged with nitrogen by repeated evacuation and refilling. The reaction vessel is placed in a silicone oil both preheated to a temperature of 220° C. The temperature is increased to 250° C., and after a period of ten minutes the viscous melt solidifies. Evacuation to a pressure of 0.1 mm. for 45 minutes at a temperature of 260° C. results in the formation of a solid cake, which is finely powdered and reheated at temperatures rising within five hours to 400° C., at a pressure of 0.1 mm. The resulting polymer exhibits an inherent viscosity of 0.86, measured in sulfuric acid. The product is poly-2,2'-(biphenylene 4'',4''')-5,5'-bibenzimidazole.

*Example IX*

A mixture of 2.14 grams of 3,3'-diaminobenzidine and 3.94 grams of diphenyl 2,2'-diphenate is melted together under nitrogen at a temperature of 230° C., the reaction vessel being heated by means of a Wood's metal bath. The temperature is raised to 285° C. when evolution of phenol bubbles indicates that reaction has begun. After 2½ hours of heating at temperatures around 300° C., the reaction mixture has become viscous, and vacuum is applied. The mixture is heated for ½ hour at a temperature of 310° C. and a pressure of 0.1 mm. Following cooling, the polymer is powdered and reheated under 0.1 mm. pressure for three hours at temperatures gradually rising from 300° C.–400° C. The resulting polymer has an inherent viscosity of 3.0, and melts at a temperature of 430° C. The product is poly-2,2'-(diphenylene-2'',2''')-5,5'-bibenzimidazole.

*Example X*

A mixture of 2.14 grams of 3,3'-diaminobenzidine and 3.68 grams of the diphenyl ester of 1,6-naphthalene dicarboxylic acid is melted together under nitrogen at a temperature of 220° C. Upon elevating the temperature to 240° C., the condensation reaction begins. After heating for thirty minutes at about 270° C., the reaction vessel is evacuated and further heated for a period of thirty minutes at a pressure of 1.1 mm. and a temperature of 270° C. The polymeric material is finely powdered, and reheated for a period of four hours at a pressure of 0.1 mm. and at temperatures rising up to 400° C. The resulting polymer exhibits an inherent viscosity of 2.7. The product is poly-2,2'-(naphthalene-1",6")-5,5'-bibenzimidazole.

*Example XI*

A mixture of 4.28 grams of 3,3'-diaminobenzidine and 10 grams of phenol is heated under nitrogen at a temperature of 200° C. until the composition is molten. The mixture is cooled, and 2.962 grams of phthalic anhydride are added. The reaction mixture is then heated for ½ hour at a temperature of 170° C. and for a further ½ hour at a temperature of 250° C. The reaction vessel is evacuated to a pressure of 0.1 mm. for a period of ½ hour while heated to a temperature of 270° C. The cooled product is powdered and reheated at a pressure of 0.1 mm. for a period of 5 hours at temperatures increasing during that time from 270° C. to 400° C. The resulting polymer is found to exhibit an inherent viscosity of 5.01.

*Example XII*

Diphenyl phthalate is prepared by reacting phthalyl chloride with phenol at a temperature of 130° C., and is purified by recrystallization from methanol. A mixture of 3.188 grams of diphenyl phthalate and 2.140 grams of 3,3'-diaminobenzidine is melted under nitrogen at a temperature of 250° C. and further heated for a period of ½ hour at a temperature within the range between 270° to 280° C. and further heated for a period of 1½ hours at a temperature of 300° C. Further heating at the last-named temperature for an additional period of ½ hour is effected while maintaining the pressure at 0.1 mm. The product is cooled, finely ground, and reheated at a pressure of 0.1 mm. for a period of 3½ hours while the temperature slowly rises to 400° C. The resulting polymer exhibits an inherent viscosity of 1.60.

*Example XIII*

Phthalic anhydride is converted by means of hot sodium hydrazide solution to the corresponding dicarboxylic acid which is precipitated with hydrochloric acid and recrystallized from methanol. A mixture of 1.666 grams of the so-purified phthalic acid, 2.140 grams of 3,3'-diaminobenzidine, and 5 grams of phenol is heated under nitrogen at a temperature of 220° C. After a period of 15 minutes under these conditions, the molten mixture becomes very viscous and partially solid; it is heated at a temperature of 250° C. for a period of 45 minutes. The reaction temperature is then raised to 270° C. for a period of 1 hour while the pressure is maintained at a pressure of 0.1 mm. The cooled polymer is finely ground and reheated for a period of 4 hours at a pressure of 0.1 mm., the temperature being allowed to rise to about 400° C. The resulting polymer exhibits an inherent viscosity of 2.35.

In the process of the present invention, the reactant or reactants are subjected to a temperature sufficiently high to melt them. Reduced pressure is employed to assist in removal of phenol. The temperature is then raised gradually to maintain the reacting mass in molten condition. Generally an initial temperature of about 200° C. under a pressure of less than about 0.5 mm. pressure is satisfactory with the temperature being raised gradually to about 300° C. over a half-hour period. It is preferred, however, to heat over a longer period, e.g. from about 1 to about 5 hours at a pressure below about 0.3 mm. Use of the anhydride or phenyl ester of the carboxylic acid is essential. Attempts to melt polymerize under these conditions using the methyl ester or the acid per se result in the formation of only low molecular weight product. Similarly attempts to employ interphase polymerization techniques using the acid chloride are not successful in forming high molecular weight product.

After formation of the melt polymerized product, a product of particularly high molecular weight may be formed by pulverizing the melt-formed material and subjecting the powder to high temperature under reduced pressure. Generally, a solid state powder polymerization of this type may be performed at temperatures above about 250° C. under reduced pressures. It is preferred to employ a temperature of at least about 350° C. under a pressure no greater than about 0.7 mm. A period of about 2 hours is generally satisfactory, however longer periods, e.g. 3 to 4 hours are preferred. Temperature in excess of 400° C. and periods as long as 5 hours may be used.

Among suitable poly-functional aromatic compounds which may be utilized in the process of this invention are trifunctional compounds in which all the functional groups are attached to a single ring or to a fused ring system. As examples of compounds in this category may be mentioned the phenyl esters of 3,4-diaminobenzoic acid and 6,7-diamino-β-naphthoic acid, as well as those in which the two reactive centers are located on different aromatic nuclei which are joined either through a carbon-to-carbon bond or through simple linking groups as ether linkages, methylene groups, or other similar small groups. Examples of this latter type of compound are the phenyl esters of 3',4'-diamino-3-biphenyl-carboxylic acid, m-(3,4-diaminophenoxy)-benzoic acid, and other similar compounds. It will be noted that the above-named types of compounds include all necessary reactive centers for the formation of benzimidazole nuclei, and are capable of reacting with themselves to produce polymeric materials.

Other desirable polymers which may be formed by the process of this invention utilize the phenyl esters of aromatic homocyclic or heterocyclic dicarboxylic acids which are reacted with aromatic tetraamino compounds so chosen that they contain two ortho-diamino reactive centers. These polymers have a "head-head, tail-tail" configuration. Such tetraamino compounds may have both reactive centers attached to one aromatic nucleus, either a single ring or a fused ring system, as 1,2,4,5-tetraaminobenzene, 2,3,6,7-tetraaminonaphthalene, or the like. The tetraamino compounds also include those in which there is one ortho-diamino reactive center on each of two rings, the rings being separated by a carbon-to-carbon bond, an ether linkage, a methylene group, or other similar small linking group. Among such compounds may be named as exemplary 3,3'-diaminobenzidine, 3,4,3',4'-tetraamino diphenyl ether, 3,4,3',4'-tetraamino diphenyl methane, and other similar compounds. Tetraamines bearing N-substituents, particularly lower alkyl, may be used provided each pair of orthodiamino reactive centers contains at least three hydrogens attached to nitrogen. Representative suitable phenyl esters of dicarboxylic acids are the phenyl esters of isophthalic acid, terephthalic acid, naphthalene-1,4-dicarboxylic acid, naphthalene-1,6-dicarboxylic acid, naphthalene-2,6-dicarboxylic acid, pyridine-2,5-dicarboxylic acid, pyridine-2,6-dicarboxylic acid, pyridine-3,5-dicarboxylic acid, pyrazine-2,5 - dicarboxylic acid, furan-2,5-dicarboxylic acid, quinolene 2,6-dicarboxylic acid and the like. In addition, those aromatic dicarboxylic acids wherein the two carboxylic groups are on separate aromatic nuclei, the nuclei being joined through a carbon-to-carbon bond, an ether linkage, a methylene group, or other similar linking group, may be utilized. Representative of this latter class are the diphenyl esters of the diacids of bibenzoic acid, 4,4'-biphenyl dicarboxylic acid, diphenyl ether 4,4'-dicarboxylic acid, diphenylmethane-4,4'-dicarboxylic acid and the like. The reaction of any of the above-named tetraamino aromatic compounds with the diphenyl esters of the dicarboxylic acids, may be illustrated with reference to the following equation, wherein the reactions of diphenyl isophthalate with 1,2,4,5-tetraaminobenzene is chosen as representative of the entire class of polymerizations:

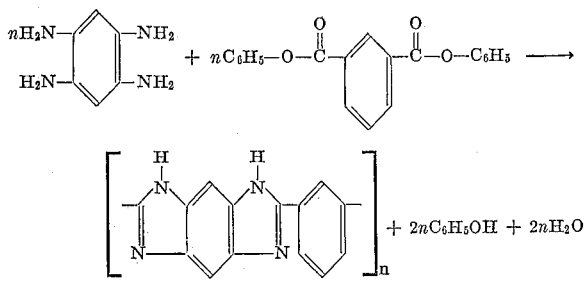

Any of the above-named diamino aromatic carboxylic acids, tetraamino compounds, and dicarboxylic acids may be further substituted with small non-reactive substituents on the aromatic nuclei. Thus, the aromatic nuclei may additionally bear lower alkyl groups as methyl or ethyl substituents, lower alkoxy groups as methoxy or ethoxy substituents, halogen atoms as chlorine or bromine atoms, or other similar small substituents which are not capable of reaction, under the conditions of condensation with the ortho diamino reactive centers or with the carboxylic acid reactive centers. Mixtures of the various tetraamines and diacid diesters may be used in any desired proportion to form copolymers.

The polymers formed by the process of the present invention, including those formed from aromatic tetraamino and the diphenyl esters of aromatic dibasic acids are characterized by a high degree of stability, showing great resistance to treatment with hydrolytic and oxidizing media, and an ability to withstand continued exposure to elevated temperatures. The polymers may, for example, be dissolved in concentrated sulfuric acid and recovered without degradation by dilution with water. Solubility in concentrated sulfuric acid is not surprising for polymeric materials, but this medium normally rapidly degrades polymers. These aromatic polybenzimidazoles are characterized by melt temperatures above about 400° C., and, in many instances, by an ability to withstand temperatures in excess of about 500° C. without softening or degrading. The polymer derived from isophthalic acid and 3,3'-diaminobenzidine is not melted by exposure to a temperature of 770° C. as is reported above and loses only 30% of its weight after exposure for several hours at temperatures up to 900° C. as is shown in the figure.

Aromatic polybenzimidazoles, prepared in accordance with this invention may be shaped to form fibers, films, and other shaped articles of wide utility. In the case of some of these polymers, melt temperatures are low enough that shaping may be accomplished directly from the melt. Where melt temperatures are too high for melt shaping, solutions may be prepared from which shaped articles may be formed. The polymers are characterized by solubility in relatively few solvents, but all are soluble in formic acid and in concentrated sulfuric acid, producing stable solutions. Many of the polymers are also soluble in such solvents as dimethyl sulfoxide and N,N-dimethylformamide, forming stable solutions which are especially well suited for the casting of films and the spinning of fibers. The use of these latter solvents is preferred for such shaping, but solutions in the former solvents may be employed, particularly the solutions in formic acid. In the form of films and fibers, the polymers continue to exhibit their stability to high temperatures and their resistance to hydrolytic and oxidizing media, greatly enhancing their utility.

The polybenzimidazoles of this invention find wide utility in numerous areas of application in the form of shaped articles wherein their highly stable nature may be effectively utilized. They are particularly useful in the form of films and fibers which show great resistance to degradation by heat, hydrolytic media, and oxidizing media. Fibers of the polymers are of value in numerous textile and industrial uses, and may be woven or knit into fabrics which will retain their properties for extended periods, even in uses where other fibers rapidly deteriorate. Films of the polymers are useful as covering and protective agents, even in locations where corrosive conditions prevail.

Many equivalent modifications will be apparent from a reading of the above to those skilled in the art without a departure from the inventive concept.

What is claimed is:
1. A polybenzimidazole having an inherent viscosity in formic acid at 25° C. of at least about 1.0 and consisting essentially of a member of the group of recurring units of the class consisting of (I) a unit of the formula

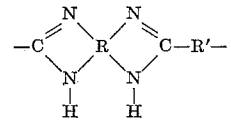

wherein R is an aromatic nucleus symmetrically tetra substituted with the nitrogen atoms of the formula being part of benzimidazole rings and with the nitrogens being bonded in pairs upon adjacent carbon atoms of the said aromatic nucleus, R' being a member of the class consisting of (1) an aromatic hydrocarbon ring and (2) a heterocyclic ring from the class consisting of (A) pyridine, (B) piperazine, (C) furan and (D) quinoline, and (II) a unit of the formula

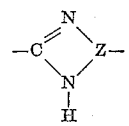

wherein Z is an aromatic hydrocarbon nucleus substituted with the nitrogen atoms of the formula being part of a benzimidazole ring and with the nitrogens being bonded in pairs upon adjacent carbon atoms of the said aromatic nucleus.

2. A linear polybenzimidazole having a head-head, tail-tail configuration among the recurring benzimidazole linkages, the said recurring benzimidazole linkages being separated by an organic radical from the class consisting of (1) a carbocyclic aromatic ring and (2) a heterocyclic ring from the class consisting of (A) pyridine, (B) pyrazine, (C) furan and (D) quinoline.

3. Polybenzimidazole consisting of recurring units of the formula

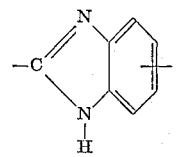

4. Poly-2,5-(6)-benzimidazole.
5. Poly-2,2'-(phenylene)-5,5'-bibenzimidazole.
6. Poly-2,6-(phenylene)-diimidazobenzene.
7. Poly-2,2'-(furylene-2",5")-5,5'-bibenzimidazole.
8. Poly - 2,2' - (biphenylene - 4",4''') - 5,5' - bibenzimidazole.
9. Poly - 2,2' - (diphenylene - 2",2''') - 5,5' - bibenzimidazole.
10. Poly - 2,2' - (naphthalene - 1",6") - 5,5' - bibenzimidazole.
11. Polybenzimidazole consisting of recurring units of the formula

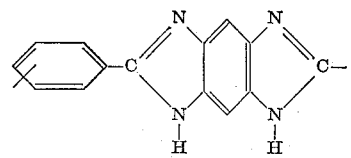

12. Polybenzimidazole consisting of recurring units of the formula

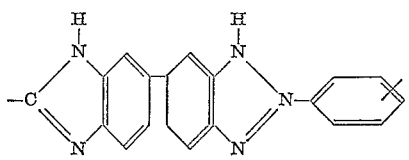

13. Poly - 2,2' - (pyridylene - 3", 5") - 5,5' - bibenzimidazole.

14. Polybenzimidazole consisting of recurring units of the formula

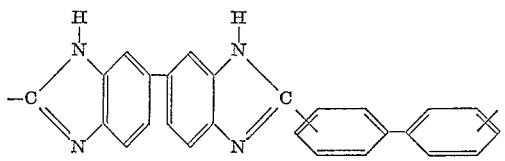

15. Polybenzimidazole consisting of recurring units of the formula

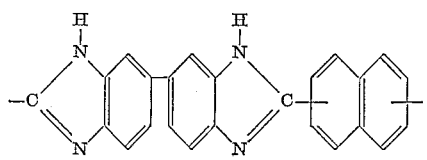

16. Polybenzimidazole consisting of recurring units of the formula

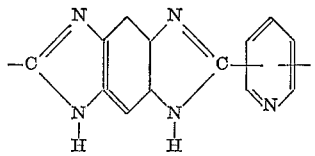

17. Polybenzimidazole consisting of recurring units of the formula

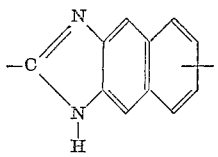

18. A process comprising (I) melt polymerizing a member of the class consisting of (A) an aromatic compound containing ortho disposed diamino substituents and a phenyl-carboxylate ester substituent and (B) a mixture of (1) an aromatic compound containing a pair of ortho-diamino substituents on the aromatic nucleus and (2) a member of the class consisting of (a) the diphenyl ester of an aromatic dicarboxylic acid, (b) the diphenyl ester of a heterocyclic dicarboxylic acid wherein the carboxyl groups are substituents upon carbon in a ring compound from the class consisting of pyridine, pyrazine, furan and quinoline and (c) an anhydride of an aromatic dicarboxylic acid and (II) solid state polymerizing the product of the melt polymerization by solidifying the product of the melt polymerization, pulverizing the solid, and heating the pulverized product at a temperature above about 250° C. under reduced pressure.

References Cited by the Examiner
UNITED STATES PATENTS

| | | | |
|---|---|---|---|
| 2,341,611 | 2/44 | Hagedorn et al. | 260—78 |
| 2,374,354 | 4/45 | Kaplan | 260—78 |
| 2,895,948 | 7/59 | Brinker et al. | 260—78 |

References Cited by the Applicant

Journal of Polymer Sciences, pages 511–539 (1961).

MURRAY TILLMAN, *Primary Examiner.*
J. R. LIBERMAN, *Examiner.*